Patented Oct. 31, 1939

2,178,210

UNITED STATES PATENT OFFICE 2,178,210

ISOLATION OF LEUCINE AND TYROSINE FROM CORN GLUTEN

Arthur Maurice Mark, Argo, Ill., assignor, by mesne assignments, to Corn Products Refining Company, New York, N. Y., a corporation of New Jersey No Drawing. Application June 3, 1938, Serial No. 211,604

11 Claims. (Cl. 260—529)

This invention relates to the isolation and recovery of the amino acids, leucine and tyrosine, from solutions containing them, particularly from solutions of amino acids produced by the acid hydrolysis of corn gluten, and more especially from hydrolysates produced by employment of hydrochloric acid as a hydrolyzing agent.

Applicant is aware of the process described in application for United States Patent of Louis Gerber, Serial No. 214,730, filed June 20, 1938, and makes no claim to such invention; applicant's process involving a different, and, it is believed, a better course of procedure; one of the advantages being that the solutions are handled at relatively low pH values, that is, in a highly acid state, as a result of which the particular amino acids that the process seeks to isolate are much less contaminated by impurities such as colloidal iron or salts resulting from neutralization of the hydrolyzing acid.

The primary object of the invention is to provide a convenient process for obtaining, from solutions of amino acids produced by the acid hydrolysis of corn gluten, the particular amino acids, leucine and tyrosine, in a highly pure state, with yields that make the operation profitable.

According to the preferred embodiment of the invention, first, hydrochloric acid is introduced into the solution produced by the hydrolysis of the protein substance, after humin substances have been removed, and the density and temperature of the solution are regulated to bring about the crystallization of glutamic acid hydrochloride which is then removed from the solution, all substantially as described in United States application of J. Paul Bishop, filed December 6, 1937, Serial No. 178,428; second, the hydrogen ion concentration of the solution is adjusted to a pH of 0.9 to 1.0, preferably to pH 1.0, by the addition of a suitable alkali, such as sodium hydroxide, and the temperature and density are regulated to bring about precipitation of crude or somewhat impure leucine; tyrosine and the other amino acids remaining in the solution; third, the crude leucine precipitate is preferably given certain refining operations to increase its purity; fourth, to the filtrates from the foregoing operations (containing all of the amino acids from the hydrolysis of the corn gluten except glutamic acid and leucine) is added a suitable alkaline substance, preferably sodium hydroxide to bring the hydrogen ion concentration to pH 2.4–3.4, preferably 2.4, and the density and temperature of the solution are regulated to bring about precipitation of crude tyrosine which is removed by filtration or centrifuging; fifth, the crude tyrosine is preferably given certain refining operations to increase its purity.

The example which follows illustrates the application of the invention to practice. The example is to be considered as typical and informative and not as limiting the invention to the particulars described; the intention being to cover all equivalents and all modifications of the invention within the scope of the appended claims.

Example (1) 100 pounds of de-starched corn gluten is boiled with 330 pounds of 20% hydrochloric acid for 12 hours.

(2) The hydrolysate is cooled to 140° F., centrifuged and washed with hot water. This gives a residue of 14 pounds of humin substance.

Elimination of the glutamic acid (3) The centrifuged filtrate is evaporated to about 30° Baumé.

(4) The concentrated solution is cooled to 55° F. and there is added thereto 125 pounds of 37% hydrochloric acid, giving a liquor of about 28° Baumé.

(5) This liquor is cooled to 45° F., and agitated for 30 hours in a crystallizer having a rotary agitator moving at the rate of one revolution in 30 minutes. This brings about the crystallization of glutamic acid hydrochloride.

(6) The massecuite is spun in a perforated basket centrifuge. The operation gives about 100 pounds of wet glutamic acid hydrochloride which may be treated for the production of glutamic acid and/or sodium glutamate as described in the application of J. Paul Bishop, Serial No. 178,428, filed December 6, 1937; or it may be utilized otherwise as desired.

Isolation of leucine (7) The concentration of the filtrate from operation (6) is adjusted to 29°–31° Baumé, preferably 30° Baumé, and there is added 12 gallons of filtrate, resulting from the filtration of the tyrosine precipitate in the 2.4 pH liquor, as described in operation (30) below.

(8) The liquor thus obtained is evaporated to 25°–26½° Baumé, preferably to 25° Baumé, giving about 12 gallons of liquor.

(9) To this liquor is added 15 gallons of 35% solution of sodium hydroxide which will result in giving the mixture a hydrogen ion concentration of pH 0.9–1.0, the preferred pH being 1.0.

(10) The 27 gallons of 1.0 pH liquor is cooled to 70°–80° F., preferably 75° F., and is allowed to stand for 12 to 24 hours. This brings about precipitation of leucine.

(11) The filtrate is removed from the leucine by filtering or centrifuging. This gives 56 pounds of crude leucine and a filtrate containing tyrosine and the other amino acids except glutamic acid.

The refinement of the crude leucine

(12) 56 pounds of crude leucine is dissolved in 12 to 17 gallons, preferably 12 gallons, of boiling water, and 8 pounds of activated carbon is added thereto.

(13) The de-colorization of the solution requires from 10 to 30 minutes, after which the carbon is filtered off.

(14) The filtrate is evaporated to about 3 to 4 gallons.

(15) The concentrated filtrate is cooled to 70°–80° F., preferably 75° F., and allowed to stand for 12 to 24 hours, the leucine being precipitated.

(16) The precipitate is filtered or centrifuged, yielding about 20 pounds of semi-refined leucine.

(17) The 20 pounds of semi-refined leucine is dissolved in 6 gallons of boiling water to which is added 5 pounds of activated carbon.

(18) After 10 to 30 minutes the carbon is removed by filtration.

(19) The solution is evaporated to about ¼ of its volume, that is, to about 1½ gallons.

(20) The concentrated solution is cooled to 70°–80° F., preferably to 75° F., and allowed to stand for 12 to 24 hours.

(21) The precipitate consisting of fairly pure leucine is removed by filtering or centrifuging, and is air-dried at room temperature for 12 to 24 hours. The yield is 8 pounds of leucine which analyzes about 90% pure, the rest consisting of about 5% sodium chloride, and about 5% unknown organic matter. This product can be further refined to produce a product analyzing over 99% leucine by subjecting it again to refining steps 17 to 21, inclusive.

The production of crude tyrosine

(22) To the 27 gallons of filtrate from operation (11) are added three gallons of filtrate from operation (16) and 1½ gallons of filtrate from operation (21). This gives a total of 31½ gallons of amino acid liquor containing all of the corn gluten amino acids except leucine and glutamic acid.

(23) There is added to this liquor about 2.7 gallons of 35% sodium hydroxide which will give the mixture a hydrogen ion concentration of pH 2.4 to 3.4, the preferred pH being 2.4.

(24) The liquor is cooled to 35° to 40° F., preferably to 40° F., and allowed to stand for 24 hours or longer, which brings about the precipitation of tyrosine.

(25) The precipitate is removed from the solution, the operation yielding 25 pounds of crude tyrosine. The filtrate is not utilized according to the present process.

Refinement of the crude tyrosine

(26) 25 pounds of crude tyrosine is dissolved in 10 to 14, preferably 12, gallons of boiling water, containing 0.2 to 0.3, preferably 0.2 gallon, of hydrochloric acid of 28% concentration. The addition of this small amount of acid appears to be necessary in order to dissolve the tyrosine.

(27) To this liquor is added 10 pounds of activated carbon. The de-colorizing operation takes from 10 to 30 minutes, after which the carbon is filtered off.

(28) The hydrogen ion concentration of the filtrate is adjusted to pH 2.4 to 3.4, the preferred pH being 2.4, by adding about 0.1 gallon of 35% sodium hydroxide.

(29) The tyrosine is crystallized for 16 to 24 hours at from 70° to 80° F., preferably at 75° F.

(30) The massecuite is filtered or centrifuged, and the crystals air-dried. This gives 2 pounds of pure tyrosine which will be found to contain only 0.1% to 0.2% of ash or other impurities, most of which is sodium chloride.

The resulting 12 gallons of filtrate is mixed with liquor from operation (6), as stated in the description of operation (7).

For the production of leucine it is possible to omit the operation of removing the glumatic acid before treating the solution for isolation of the leucine by precipitation. That is, the protein hydrolysate may be treated substantially as specified in operations (7) to (11) for the precipitation at low pH of the leucine, which latter may then be refined as above described. This modification of the process, which is not claimed specifically herein, being the subject matter of a co-pending application, Serial No. 230,615, filed September 19, 1938, is not satisfactory so far as the subsequent tyrosine separation is concerned, the tyrosine yield being considerably less than that obtained when the glumatic acid is first removed.

I claim:

1. Process of treating a solution of amino acids produced by the acid hydrolysis of corn gluten for isolation and recovery of leucine and tyrosine which comprises: first eliminating glutamic acid from the solution; then adjusting the temperature and density of the solution, and the hydrogen ion concentration to about pH 0.9 to 1.0, to bring about precipitation of leucine; and, after removal of the precipitate, adjusting the temperature and density of the solution, and the hydrogen ion concentration to about pH 2.4 to 3.4, to bring about precipitation of tyrosine.

2. Process of obtaining leucine nad tyrosine from corn gluten which comprises: hydrolyzing the corn gluten with hydrochloric acid; eliminating glutamic acid from the solution; adjusting the temperature and density of the solution, and the hydrogen ion concentration to about pH 0.9 to 1.0, to bring about precipitation of leucine; and, after the removal of the precipitate, adjusting the temperature and density of the solution, and the hydrogen ion concentration to about pH 2.4 to 3.4, to bring about precipitation of tyrosine.

3. Process of obtaining leucine from a solution of amino acids produced by the acid hydrolysis of corn gluten which comprises: eliminating glutamic acid from the solution; adjusting the hydrogen ion concentration to about pH 0.9 to 1.0; and removing from the solution precipitated leucine.

4. Process of obtaining leucine from corn gluten which comprises: hydrolyzing the corn gluten with hydrochloric acid; eliminating glutamic acid from the solution; adjusting the hydrogen ion concentration to about pH 0.9 to 1.0; and removing from the solution precipitated leucine.

5. Process of obtaining leucine from a solution of amino acids which comprises: eliminating glutamic acid from the solution; adjusting the hydrogen ion concentration to about pH 0.9 to 1.0; and removing from the solution precipitated leucine.

6. Process of obtaining leucine from a solution of amino acids produced by the acid hydrolysis of corn gluten which comprises: eliminating glutamic acid from the solution; adjusting the hydrogen ion concentration to about pH 0.9 to 1.0; removing from the solution precipitated crude leucine; and refining the crude leucine by dissolving in water, concentrating and crystallization at a temperature of substantially 70°–80° F. with subsequent removal of the leucine precipitate.

7. Process of treating a solution of amino acids produced by acid hydrolysis of corn gluten for the isolation and recovery of leucine which comprises: adjusting the temperature and density of the solution, and the hydrogen ion concentration thereof to about pH 0.9 to 1.0 to bring about precipitation of leucine; and removing the precipitate from the solution.

8. Process of treating a solution of amino acids produced by the acid hydrolysis of corn gluten for the isolation and recovery of tyrosine which comprises: first eliminating glutamic acid from the solution; then adjusting the hydrogen ion concentration to about pH 0.9 to 1.0 and the density and temperature of the solution to supersaturating density and temperature; removing the leucine precipitate from the solution; adjusting the hydrogen ion concentration of the solution to about pH 2.4–3.4 and the temperature and density to supersaturating temperature and density; and then removing the precipitated tyrosine from the solution.

9. Process of obtaining tyrosine from corn gluten which comprises: hydrolyzing the corn gluten with hydrochloric acid; eliminating glutamic acid from the hydrolysate; adjusting the hydrogen ion concentration to about pH 0.9 to 1.0 and the density and temperature of the solution to supersaturating density and temperature; removing the leucine precipitate from the solution; adjusting the hydrogen ion concentration of the solution to about pH 2.4 to 3.4 and the temperature and density to supersaturating temperature and density; and then removing the precipitated tyrosine from the solution.

10. Process of treating a solution of amino acids for the isolation and recovery of tyrosine which comprises: eliminating glutamic acid from the solution; adjusting the hydrogen ion concentration to about pH 0.9 to 1.0 and the density and temperautre of the solution to supersaturating density and temperature; removing the leucine precipitate from the solution; adjusting the hydrogen ion concentration of the solution to about pH 2.4 to 3.4 and the temperature and density to supersaturating temperature and density; then removing the precipitated tyrosine from the solution.

11. Process of treating a solution of amino acids produced by the acid hydrolysis of corn gluten for the isolation and recovery of tyrosine which comprises: first eliminating glutamic acid from the solution; then adjusting the hydrogen ion concentration to about pH 0.9 to 1.0 and the density and temperature of the solution to supersaturating density and temperature; removing the leucine precipitate from the solution; adjusting the hydrogen ion concentration of the solution to about pH 2.4 to 3.4 and the temperature and density to supersaturating temperature and density; then removing the precipitated tyrosine from the solution; dissolving the tyrosine in water containing hydrochloric acid and re-crystallizing the same.

ARTHUR MAURICE MARK.